US008645897B1

(12) United States Patent
Nandini et al.

(10) Patent No.: US 8,645,897 B1
(45) Date of Patent: Feb. 4, 2014

(54) INTEGRATED CIRCUIT DESIGN VERIFICATION SYSTEM

(71) Applicants: Nandini, Noida (IN); Gaurav Gupta, Chennai (IN); Rohit Srivastava, Noida (IN)

(72) Inventors: Nandini, Noida (IN); Gaurav Gupta, Chennai (IN); Rohit Srivastava, Noida (IN)

(73) Assignee: Freescale Semiconductor, Inc., Austin, TX (US)

( * ) Notice: Subject to any disclaimer, the term of this patent is extended or adjusted under 35 U.S.C. 154(b) by 0 days.

(21) Appl. No.: 13/735,054

(22) Filed: Jan. 7, 2013

(51) Int. Cl.
 *G06F 17/50* (2006.01)
(52) U.S. Cl.
 USPC ............ 716/136; 716/102; 716/106; 716/111
(58) Field of Classification Search
 USPC .................................. 716/102, 106, 111, 136
 See application file for complete search history.

(56) References Cited

U.S. PATENT DOCUMENTS

| 6,269,467 | B1 * | 7/2001 | Chang et al. .................. 716/104 |
| 6,421,322 | B1 | 7/2002 | Koziy et al. |
| 6,678,645 | B1 * | 1/2004 | Rajsuman et al. ............. 703/20 |
| 6,993,740 | B1 | 1/2006 | Bergamaschi et al. |
| 7,185,295 | B2 * | 2/2007 | Park et al. ..................... 716/136 |
| 7,225,416 | B1 | 5/2007 | Pritchard et al. |
| 7,366,650 | B2 * | 4/2008 | Nightingale et al. ........... 703/26 |
| 7,472,051 | B2 * | 12/2008 | Mariani et al. ................. 703/13 |
| 7,577,540 | B2 * | 8/2009 | Wang et al. .................... 702/119 |
| 7,673,264 | B1 * | 3/2010 | Darbinyan et al. ........... 716/138 |
| 7,823,017 | B2 * | 10/2010 | Bueti et al. ...................... 714/30 |
| 7,991,604 | B2 * | 8/2011 | Lee .................................. 703/14 |
| 8,136,065 | B2 * | 3/2012 | Huang et al. .................. 716/106 |

OTHER PUBLICATIONS

Bombieri, Nicola; Deganello, Nicola; and Fummi, Franco, "Integrating RTL IPs into TLM Designs Through Automatic Transactor Generation", '08 Proceedings of the Conference on Design, Automation and Test in Europe, 2008, pp. 15-20.
Tayachi, Tarek and Martinez, Pierre-Yves, "Integration of an STBus Type 3 Protocol Custom Component into a HLS Tool", Design and Technology of Integrated Systems in Nanoscale Era, 2008, DTIS 2008, 3rd International Conference, Mar. 25-27, 2008, pp. 1-4.
Nodine, Mark, "Automatic Testbench Generation for Rearchitected Designs", Microprocessor Test and Verification, 2007. MTV '07. Eighth International Workshop, Dec. 5-6, 2007, pp. 128-136.
Cho, Kwanghyun; Kim, Jaebeom; Jung, Euibong; Kim, Sik; Li, Zhenmin; Cho, Young-Rae; Min, Byeong; and Choi, Kyu-Myung, "Reusable Platform Design Methodology for SoC Integration and Verification", SoC Design Conference, 2008, ISOCC '08, International, Nov. 24-25, 2008, vol. 1, pp. I-78-I-81.

* cited by examiner

*Primary Examiner* — Naum Levin
(74) *Attorney, Agent, or Firm* — Charles Bergere

(57) ABSTRACT

An integrated circuit (IC) design verification system includes a memory for storing an IC design and a processor in communication with the memory. The IC design includes multiple IP cores and the design verification apparatus includes multiple verification modules. The processor configures a first set of connections between the IP cores and the verification modules based on a first connection database and verifies each IP core independently using the first set of connections. Thereafter, the processor configures a second set of connections between the IP cores and the verification modules based on a second connection database generated based on the first connection database, and verifies the multiple IP cores together using the second set of connections.

19 Claims, 4 Drawing Sheets

INTEGRATED CIRCUIT DESIGN VERIFICATION SYSTEM

BACKGROUND OF THE INVENTION

The present invention relates generally to integrated circuits (ICs), and more particularly, to an IC design verification system.

Integrated circuits (ICs) are verified for correct functionality and logical accuracy to ensure they are free of design related errors. Verification is performed using electronic design verification tools. Many IC designs include multiple functional and logical circuits that are referred to as Intellectual Property (IP) modules or IP cores. The IP cores are inter-connected based on design specifications. Examples of IP cores include serial ports, audio components, generic digital signal processors (DSPs), codec processors, and graphics processing units (GPUs).

The IP cores are verified using verification modules (also known as verification IPs or VIPs). VIPs are standard-compliant and reusable verification blocks that are used in the design verification tools for functional verification of the cores. Examples of VIPs include bus functional models, traffic generators, protocol monitors, and functional coverage blocks. The VIPs are connected to the I/O ports of the IP cores to initiate the verification process.

An IC design is often verified in two stages, IP level verification and SoC level verification. For IP level verification, the design verification apparatus verifies each IP core using a corresponding VIP, and for SoC level verification, it verifies the SoC as a whole, which may include verifying two or more IP cores together using two or more VIPs. Existing SoC level verification methods are tedious and time consuming as they require a considerable amount of time for re-configuring connections between the IP cores and VIPs after the completion of the IP level verification. The number of interconnections increases manifold with the complexity of the IC, which further increases the verification time. Moreover, if an error in connections is identified during SoC level verification, the connections have to be re-configured afresh, which for an IC design with high complexity, may take multiple man weeks. Thus, existing testing tools and techniques introduce a significant delay in time-to-market (TTM) of an integrated circuit.

Therefore, there is a need for a solution that reduces the time required for configuring connections between IP cores of an IC design and corresponding VIPs during SoC level verification, that reduces the time required for verifying an IC design, and that overcomes the above-mentioned limitations of existing design verification solutions.

BRIEF DESCRIPTION OF THE DRAWINGS

The following detailed description of the preferred embodiments of the present invention will be better understood when read in conjunction with the appended drawings. The present invention is illustrated by way of example, and not limited by the accompanying figures, in which like references indicate similar elements. It is to be understood that the drawings are not to scale and have been simplified for ease of understanding the invention.

DETAILED DESCRIPTION OF THE PRESENT INVENTION

Figure 1:
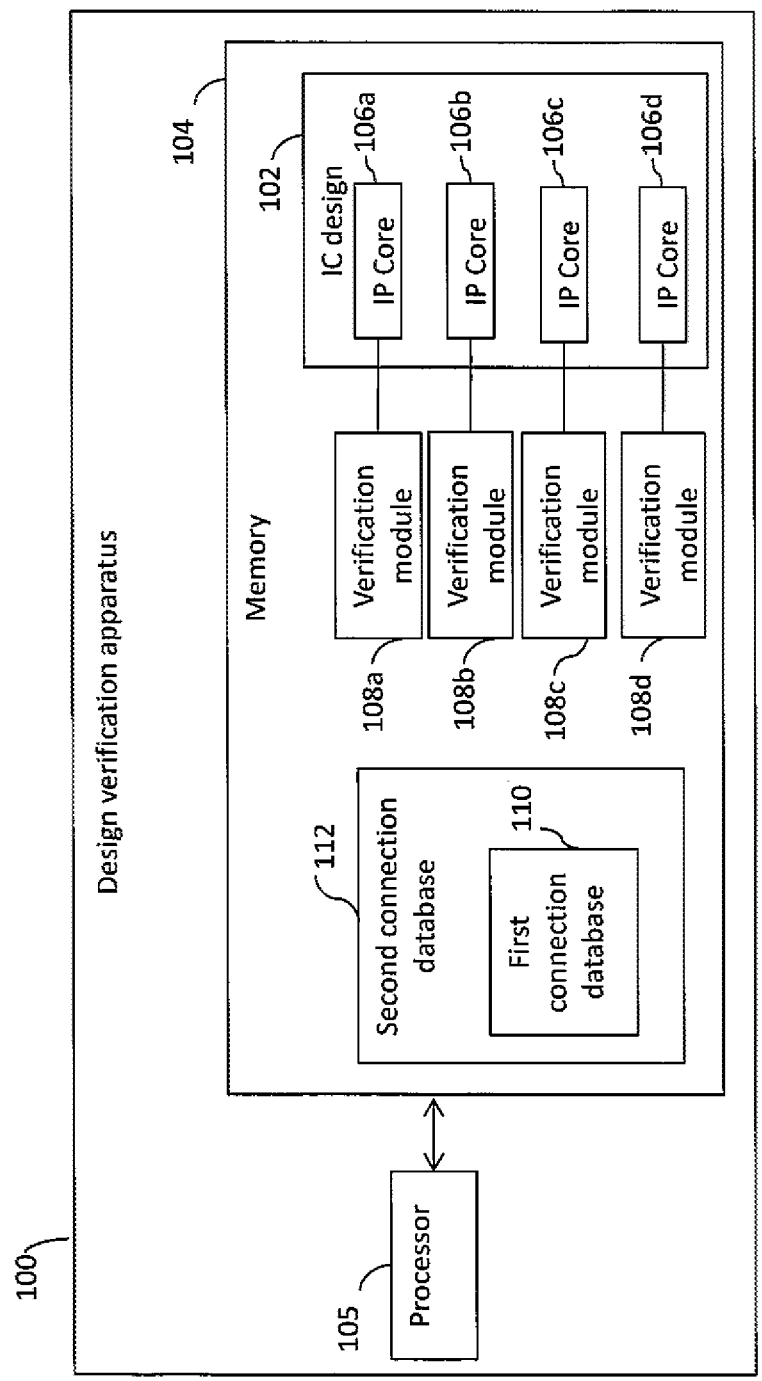
FIG. 1 is a schematic block diagram of a design verification apparatus for verifying an integrated circuit design in accordance with an embodiment of the present invention.

The detailed description of the appended drawings is intended as a description of the currently preferred embodiments of the present invention, and is not intended to represent the only form in which the present invention may be practiced. It is to be understood that the same or equivalent functions may be accomplished by different embodiments that are intended to be encompassed within the spirit and scope of the present invention.

In an embodiment of the present invention, a method for verifying an integrated circuit (IC) design using a design verification apparatus is provided. The design verification apparatus includes a memory that stores the IC design and a processor in communication with the processor. The IC design includes a plurality of IP cores and the design verification apparatus includes a plurality of verification modules. A first set of connections is configured between the plurality of IP cores and the corresponding plurality of verification modules based on a first connection database. Each IP core is verified independently by way of corresponding verification module, using the first set of connections and a first set of test patterns generated by the design verification apparatus. Thereafter a second set of connections is configured between the plurality of IP cores and the plurality of verification modules based on a second connection database. The second connection database is generated using the first connection database. The plurality of IP cores are verified together by way of corresponding plurality of verification modules using the second set of connections and a second set of test patterns generated by the design verification apparatus.

In another embodiment of the present invention, a method for verifying an integrated circuit design having a plurality of IP cores using a design verification apparatus is provided. The design verification apparatus includes a memory that stores the integrated circuit design and a processor in communication with the memory. The design verification apparatus also includes a plurality of verification modules. A first set of connections between the plurality of IP cores and the corresponding plurality of verification modules is configured based on a first connection database. The first connection database includes connection information of input/output (I/O) ports of each IP core and corresponding verification module, for verification of each IP core independently. Each IP core is verified independently by way of corresponding verification module using the first set of connections and a first set of test patterns generated by the design verification apparatus. The first connection database is updated based on the verification of each IP core independently. Further, a second connection database is generated based on the first connection database and interconnection information of the plurality of IP cores, wherein the second connection database includes connection information of I/O ports of the plurality of IP cores and corresponding plurality of verification modules for verification of the plurality of IP cores together. A second set of connections between the plurality of IP cores and the plurality of verification modules is configured based on the second connection database. Then, the plurality of IP cores are verified together by way of corresponding plurality of verification modules, using the second set of connections and a second set of test patterns generated by the design verification apparatus. The second connection database is then updated based on the verification of the plurality of IP cores together.

Various embodiments of the present invention provide a method and apparatus for verifying an integrated circuit (IC) design that includes a plurality of IP cores. The design verification apparatus includes a plurality of verification modules (VIPs) to verify the IP cores. The design verification apparatus configures a first set of connections between the input/output (I/O) ports of the IP cores and corresponding VIPs using a first connection database, for IP level verification of each IP core independently. Upon completion of IP level verification, the design verification apparatus generates a second connection database using connection information from the first connection database. The design verification apparatus uses information from the first connection database to generate a hierarchy of connections between the VIPs and the IP cores and configure a second set of connections between the VIPs and I/O ports of the IP cores for SOC level verification of two or more IP cores together, as opposed to conventional design verification apparatuses that configure such connections afresh for SoC level verification. This reduces the time required for configuring the second set of connections considerably. Moreover, if errors are identified during SoC level verification of the IC design, the second connection database can be appropriately modified or updated and used to re-configure the second set of connections, which reduces the overall time required for verification of the IC design. Reduction in verification time further reduces the time-to-market (TTM) of the IC.

Referring now to FIG. 1, a schematic block diagram of a design verification apparatus 100 for verifying an integrated circuit (IC) design 102 in accordance with an embodiment of the present invention is shown. The apparatus 100 is considered as external, which means that the apparatus is not part of the IC design 102 being verified, or vice-versa, that the IC design 102 is not a part of the verification apparatus 100. The IC design 102 may include a microprocessor, a microcontroller unit (MCU), a system-on-chip (SoC), or an application specific integrated circuit (ASIC) and is hereinafter also referred to as design under test (DUT). The design verification apparatus 100 includes a memory 104 for storing the IC design 102 and a processor 105 in communication with the memory 104. Examples of the memory 104 include random access memory (RAM), read only memory (ROM), and a flash memory. The design verification apparatus 100 may comprise any suitable commercially available verification tool, such as those developed commercially by Cadence, Inc., Synopsys, Inc., and Mentor Graphics, Inc. In various embodiments of the present invention, the IC design 102 includes a plurality of intellectual property (IP) cores including first through fourth IP cores 106a-106d (collectively referred to as IP cores 106). Examples of IP cores 106 include generic digital signal processors (DSPs), codec processors, graphics processing units (GPU), serial ports, audio components, and microcontrollers (MCU).

The memory 104 and processor 105 comprise a computer system that can range from a stand-alone personal computer to a network of processors and memories, to a mainframe system. The computer system preferably can run mixed signal verification tools that can simulate digital and analog circuits, such as Incisive™ Unified Simulator (IUS) by Cadence Design Systems, Inc. Such tools and computer systems are known to those of skill in the art.

The design verification apparatus 100 includes a plurality of verification modules 108 including first through fourth verification modules 108a-108d (collectively referred to as verification modules or verification IPs or VIPs 108) that are stored in the memory 104. The VIPs 108 can be connected to the IP cores 106 for verifying each IP core 106 independently or to two or more IP cores 106 together. Examples of VIPs 108 include bus functional models, traffic generators, protocol monitors, and functional coverage blocks, such as those commercially available from Cadence, Inc., Synopsys, Inc., and nSys, Inc.

The design verification apparatus 100 further includes first and second connection databases 110 and 112 in the memory 104. The first connection database 110 includes connection information of the input/output (I/O) ports of each IP core 106 and the corresponding VIP 108 for verifying each IP core 106 independently (also known as IP level verification). In an exemplary embodiment of the present invention, the first connection database 110 includes connection information of I/O ports of the IP core 106a and the VIP 108a, connection information of I/O ports of the IP core 106b and the VIP 108b, and so forth.

The second connection database 112 stores connection information of I/O ports of the IP cores 106 and the VIPs 108 for verifying two or more IP cores 106 together (also known as SoC level verification). Preferably, the first and second connection databases 110 and 112 store the connection information in the form of System Verilog interface information. In one embodiment, the connection information may be input to the first and second connection databases 110 and 112 by a user. In another embodiment, the connection information may be automatically generated by the processor 105 when the IC design 102 is input to the design verification apparatus 100. In yet another embodiment, the processor 105 automatically generates the second connection database 112 using the first connection database 110, as explained below.

In operation, the processor 105 configures a first set of connections between each IP core 106 and the corresponding VIP 108, based on the first connection database 110. If an error (such as parsing errors) is detected, the first connection database 110 is updated to rectify the error. Then, the design verification apparatus 100 generates a first set of test patterns for IP level verification of each IP core 106. In an embodiment of the present invention, the first set of test patterns may be software programs that are written to the design verification apparatus 100 and stored in the memory 104. In another embodiment, the design verification apparatus 100 may automatically generate the first set of test patterns based on inputs provided by a test engineer.

Thereafter, the processor 105 initiates verification of each IP core 106 independently by way of corresponding VIP 108, using the first set of test patterns. The verification involves verifying the functionality of each IP core 106 using the first set of test patterns. In case the first set of connections need to be re-configured based on errors detected in IP level verification, the processor 105 updates the first connection database 110. The IP level verification may be re-iterated thereafter until it is successfully completed.

Upon completion of the IP level verification, the processor 105 generates the second connection database 112 based on the first connection database 110 and interconnection information of the IP cores 106. For example, the second connection database 112 is generated by modifying the first connection database 110 in view of interconnection information of the IP cores 106.

The processor 105 may use a suitable programming language such as structured query language (SQL) to create a hierarchy of interconnections between the IP cores 106 and the VIPs 108 based on the first connection database 110 and generate the second connection database 112.

Thereafter, the processor 105 configures a second set of connections between the IP cores 106 and the VIPs 108 based on the second connection database 112. If an error (such as parsing errors) is detected, the second connection database 112 is updated to rectify the error. Then, the design verification apparatus 100 generates a second set of test patterns for SOC level verification of the IC design 102. The processor 105 initiates the verification of the IC design 102 by way of the VIPs 108, using the second set of test patterns. The verification involves verifying the functionality of the IC design 102 using the second set of test patterns. In case the second set of connections need to be re-configured based on errors detected in SOC level verification, the processor 105 updates the second connection database 112. The SOC level verification may be re-iterated thereafter until it is successfully completed.

If required, the first connection database 110 is also updated based on the changes to the second connection database 112. For example, if the error occurs in the connections between the IP cores 106 and corresponding VIPs 108, the first connection database 110 is updated and the second connection database 112 is updated accordingly. If the error occurs in the hierarchy of connections between the IP cores 106 and the VIPs 108, only the second connection database 112 is updated.

Figure 2:
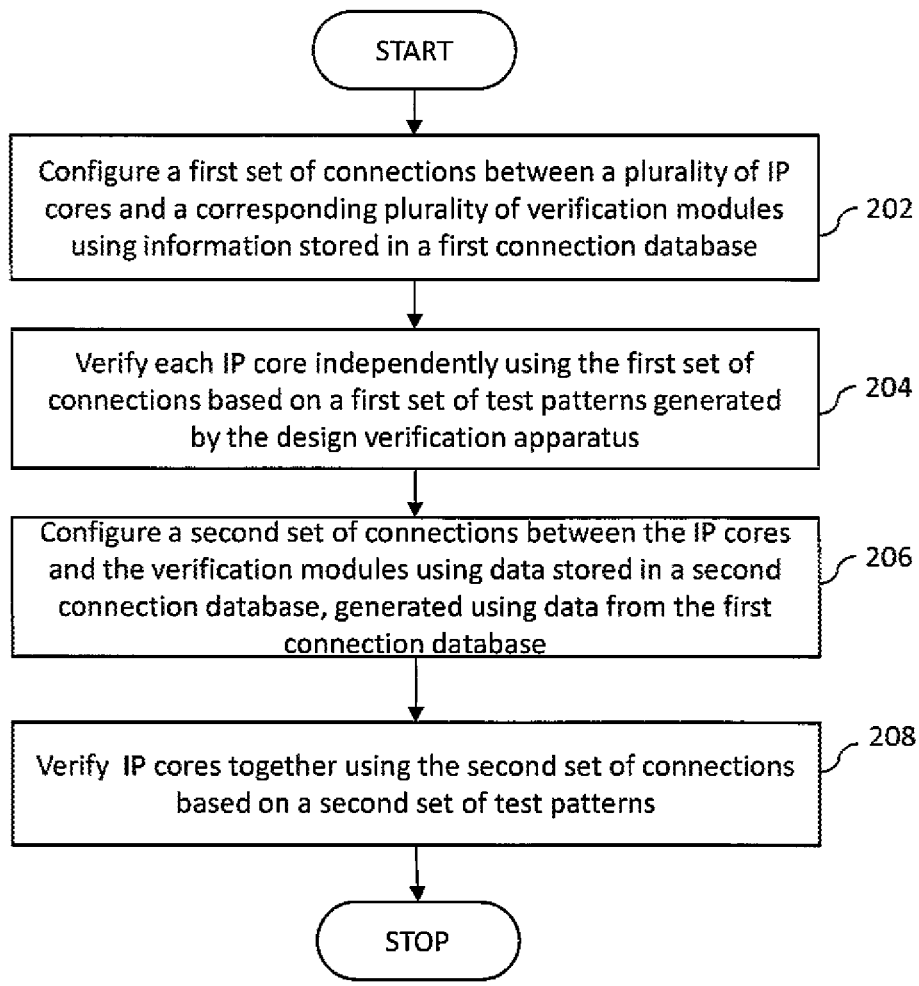
FIG. 2 is a flow chart illustrating a method for verifying an integrated circuit design in accordance with an embodiment of the present invention.

Referring now to FIG. 2, a flow chart illustrating a method for verifying the IC design 102 in accordance with an embodiment of the present invention is shown. Steps of the method for verifying the integrated circuit design 102 are executed by the design verification apparatus 100, and have been explained in conjunction with FIG. 1. At step 202, the first set of connections is configured between the IP cores 106 and the corresponding VIPs 108 based on the first connection database 110. At step 204, each IP core 106 is verified independently using the first set of connections, based on the first set of test patterns generated by the design verification apparatus 100. Each IP core 106 is verified by corresponding VIP 108 using the first set of test patterns. At step 206, the second set of connections is configured between the IP cores 106 and the VIPs 108 based on the second connection database 112. The second connection database 112 is generated using the first connection database 110. At step 208, two or more IP cores 106 are verified together using the second set of connections, based on the second set of test patterns. The two or more IP cores 106 are verified together by two or more VIPs 108 using the second set of test patterns.

Figure 3A:
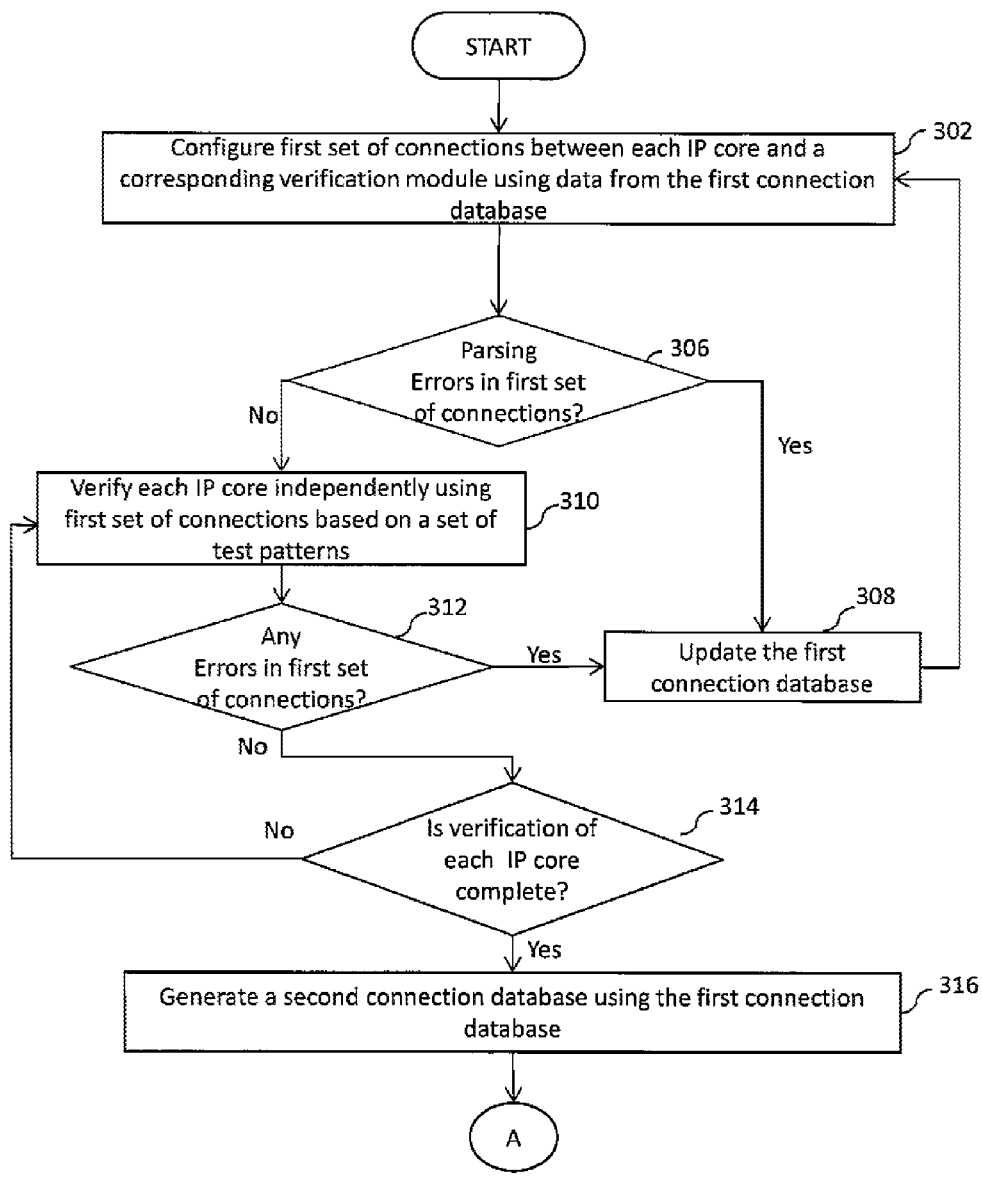
FIGS. 3A and 3B are a flow chart illustrating a method for verifying an integrated circuit design in accordance with an embodiment of the present invention.
Figure 3B:
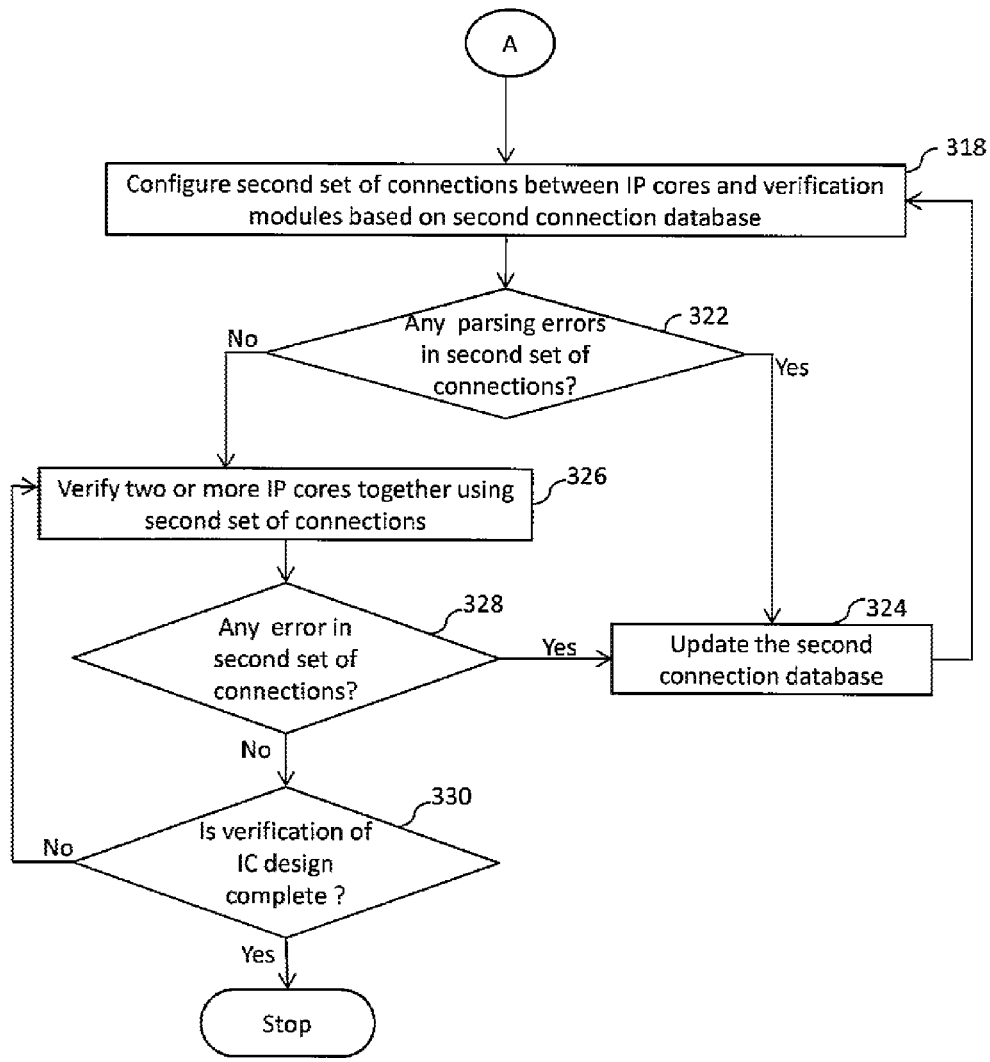

Referring now to FIG. 3, a detailed flow chart illustrating a method for verifying the IC design 102 in accordance with an embodiment of the present invention is shown. At step 302, the first set of connections is configured between the IP cores 106 and the VIPs 108 based on the first connection database 110. At step 306, a check is performed to determine if there are any errors (parsing errors) in the first set of connections.

If an error is detected at step 306, the first connection database 110 is updated to rectify the errors at step 308 and the method returns to step 302. Steps 302 to 306 are repeated iteratively until the first set of connections is free from errors. Thereafter, step 310 is executed, where each IP core 106 is verified independently using the first set of connections, based on the first set of test patterns generated by the design verification apparatus 100. Each IP core 106 is verified by corresponding VIP 108 using the first set of test patterns. The first set of connections is verified for errors at step 312 (errors that may have been identified during IP level verification). If an error is identified, steps 308 to 310 are repeated iteratively until the errors are rectified. When no more errors are identified at step 312, step 314 is executed to check if the IP level verification is complete. If the IP level verification is not complete, steps 310 to 314 are repeated to ensure completion of the IP level verification of the IC design 102.

When the IP level verification is complete, the first connection database 110 is frozen, which means that the first connection database 110 includes error-free reusable connection data. Thus, the first connection database 110 is ready to be used for SoC level verification of the IC design 102.

At step 316, the second connection database 112 is generated based on the first connection database 110 and interconnection information of the IP cores 106. At step 318, the second set of connections is configured between the IP cores 106 and the VIPs 108 based on the second connection database 112. At step 322, a check is performed to determine if there are any errors in the second set of connections.

If an error is detected at step 322, the second connection database 112 is updated to rectify the errors at step 324 and the method returns to step 318. Steps 318 to 322 are repeated iteratively until the second set of connections is free from errors. When no error is detected at step 322, step 326 is executed, where two or more IP cores 106 are verified together using the second set of connections, based on the second set of test patterns generated by the design verification apparatus 100. The two or more IP cores 106 are verified together by two or more VIPs 108 using the second set of test patterns. The second set of connections is again verified for errors at step 328 (errors that may have been identified during the SOC level verification). If an error is identified, steps 324 to 328 are repeated iteratively until all the errors are rectified. When no more errors are detected at step 328, step 330 is executed to check if the SoC level verification of the IC design 102 is complete. If the SoC level verification is not complete, steps 326 to 330 are repeated to ensure completion of the SoC level verification of the IC design 102.

In an exemplary embodiment of the present invention, the design verification method of the present invention was used to configure a test bench for verifying a serial communication interface (SCI) having three interfaces. The test bench was verified using Cadence Incisive™ Unified Simulator (IUS) and Synopsys Verilog Compiler Simulator (VCS) tools. The verification time was reduced from 2 days (using conventional verification methods) to approximately half an hour by the verification method of the present invention. Thus, for a medium sized SoC that has about 65 SCI interfaces, the test bench integration and verification time is reduced from approximately 3 weeks to a few days.

While various embodiments of the present invention have been illustrated and described, it will be clear that the present invention is not limited to these embodiments only. Numerous modifications, changes, variations, substitutions, and equivalents will be apparent to those skilled in the art, without departing from the spirit and scope of the present invention, as described in the claims.

The invention claimed is:

1. A design verification apparatus for verifying an integrated circuit design, wherein the integrated circuit (IC) design includes a plurality of Intellectual Property (IP) cores and the design verification apparatus includes a plurality of verification modules, the design verification apparatus comprising:

a memory used to store the integrated circuit design; and
a processor in communication with the memory, wherein the processor:
configures a first set of connections between the plurality of IP cores and the corresponding plurality of verification modules based on a first connection database;

initiates verification of each IP core independently by way of corresponding verification module, using the first set of connections and a first set of test patterns generated by the design verification apparatus;

configures a second set of connections between the plurality of IP cores and the plurality of verification modules based on a second connection database generated using the first connection database;

initiates verification of the plurality of IP cores together by way of corresponding plurality of verification modules, using the second set of connections and a second set of test patterns generated by the design verification apparatus; and updates the second connection database based on the verification of the plurality of IP cores together.

2. The design verification apparatus of claim 1, wherein the processor updates the first connection databases based on the verification of each IP core independently.

3. The design verification apparatus of claim 1, wherein the processor updates the first and second connection databases based on detecting a parsing error in the first and second sets of connections, respectively.

4. The design verification apparatus of claim 1, wherein the first connection database includes connection information of I/O ports of each IP core and corresponding verification module, for verification of each IP core independently.

5. The design verification apparatus of claim 1, wherein the second connection database includes connection information of I/O ports of the plurality of IP cores and corresponding plurality of verification modules, for verification of the plurality of IP cores together.

6. The design verification apparatus of claim 1, wherein configuring the first set of connections includes connecting input/output (I/O) ports of each IP core and corresponding verification module, based on the first connection database.

7. The design verification apparatus of claim 1, wherein configuring the second set of connections includes connecting input/output (I/O) ports of the plurality of IP cores and corresponding plurality of verification modules, based on the second connection database.

8. The design verification apparatus of claim 1, wherein the first and second connection databases are stored in the memory.

9. A method for verifying an integrated circuit design using a design verification apparatus that includes a memory that stores the integrated circuit design and a processor in communication with the memory, wherein the integrated circuit (IC) design includes a plurality of Intellectual Property (IP) cores and the design verification apparatus includes a plurality of verification modules, the method comprising:

configuring a first set of connections between the plurality of IP cores and the corresponding plurality of verification modules based on a first connection database;

initiating verification of each IP core independently by way of corresponding verification module using the first set of connections and a first set of test patterns generated by the design verification apparatus;

configuring a second set of connections between the plurality of IP cores and the plurality of verification modules based on a second connection database generated using the first connection database;

initiating verification of the plurality of IP cores together by way of corresponding plurality of verification modules, using the second set of connections and a second set of test patterns generated by the design verification apparatus; and updating the second connection database based on the verification of the plurality of IP cores together.

10. The method of claim 9 further comprising updating the first connection databases based on the verification of each IP core independently.

11. The method of claim 9 further comprising updating the first and second connection databases based on detecting a parsing error in the first and second set of connections, respectively.

12. The method of claim 9, wherein the first connection database includes connection information of I/O ports of each IP core and corresponding verification module, for verification of each IP core independently.

13. The method of claim 9, wherein the second connection database includes connection information of I/O ports of the plurality of IP cores and corresponding plurality of verification modules, for verification of the plurality of IP cores together.

14. The method of claim 9, wherein configuring the first set of connections includes connecting input/output (I/O) ports of each IP core and corresponding verification module, based on the first connection database.

15. The method of claim 9, wherein configuring the second set of connections includes connecting input/output (I/O) ports of the plurality of IP cores and corresponding plurality of verification modules, based on the second connection database.

16. A method for verifying an integrated circuit design using a design verification apparatus that includes a memory that stores the integrated circuit design, and a processor in communication with the memory, wherein the integrated circuit design includes a plurality of Intellectual Property (IP) cores and the design verification apparatus includes a plurality of verification modules, the method comprising:

configuring a first set of connections between the plurality of IP cores and the corresponding plurality of verification modules based on a first connection database, wherein the first connection database includes connection information of I/O ports of each IP core and corresponding verification module, for verification of each IP core independently;

initiating verification of each IP core independently by way of corresponding verification module using the first set of connections and a first set of test patterns generated by the design verification apparatus;

updating the first connection database based on the verification of each IP core independently;

generating a second connection database based on the first connection database, wherein the second connection database includes connection information of I/O ports of the plurality of IP cores and corresponding plurality of verification modules for verification of the plurality of IP cores together;

configuring a second set of connections between the plurality of IP cores and the plurality of verification modules based on the second connection database;

initiating verification of the plurality of IP cores together by way of corresponding plurality of verification modules, using the second set of connections and a second set of test patterns generated by the design verification apparatus; and updating the second connection database based on the verification of the plurality of IP cores together.

17. The method of claim 16, wherein configuring the first set of connections includes connecting input/output (I/O) ports of each IP core and corresponding verification module, based on the first connection database.

18. The method of claim 16, wherein configuring the second set of connections includes connecting input/output (I/O) ports of the plurality of IP cores and corresponding plurality of verification modules, based on the second connection database.

19. The method of claim 16 further comprising updating the first and second connection databases based on detecting a parsing error in the first and second set of connections, respectively.

* * * * *